United States Patent
Lee et al.

(10) Patent No.: US 7,692,909 B2
(45) Date of Patent: Apr. 6, 2010

(54) POWER SUPPLY DEVICE HAVING OVERVOLTAGE CUTOFF FUNCTION, IMAGE DISPLAY DEVICE, AND METHOD OF CUTTING OFF OVERVOLTAGE

(75) Inventors: Jin-hyung Lee, Anyang-si (KR); Kyoung-geun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 11/712,527

(22) Filed: Mar. 1, 2007

(65) Prior Publication Data
US 2008/0074818 A1 Mar. 27, 2008

(30) Foreign Application Priority Data
Sep. 26, 2006 (KR) .................. 10-2006-0093428

(51) Int. Cl.
H02H 3/20 (2006.01)
H02H 3/027 (2006.01)
(52) U.S. Cl. .................... 361/91.1; 361/91.3
(58) Field of Classification Search ............ 361/91.3, 361/91.1; 363/20
See application file for complete search history.

(56) References Cited

U.S. PATENT DOCUMENTS

| | | | | |
|---|---|---|---|---|
| 5,274,208 A | * | 12/1993 | Noda | 363/20 |
| 5,617,288 A | * | 4/1997 | Zaretsky | 361/91.1 |
| 5,621,623 A | * | 4/1997 | Kuriyama et al. | 363/20 |
| 5,864,454 A | * | 1/1999 | Zaretsky | 361/91.3 |
| 2004/0130539 A1 | * | 7/2004 | Yabu et al. | 345/204 |
| 2005/0002211 A1 | * | 1/2005 | Lee et al. | 363/44 |
| 2005/0035982 A1 | * | 2/2005 | Hong et al. | 345/698 |
| 2006/0098402 A1 | * | 5/2006 | Jang et al. | 361/683 |

FOREIGN PATENT DOCUMENTS

| | | |
|---|---|---|
| CN | 1598731 A | 3/2005 |
| KR | 95-16287 A | 11/1993 |
| KR | 1998-019587 | 7/1998 |

OTHER PUBLICATIONS

Gwang-Yeon Seo, machine translation of publication No. KR 1998-019587 U, publication date Jul. 15, 1998, pp. 1-12.*

* cited by examiner

*Primary Examiner*—Bao Q Vu
*Assistant Examiner*—Jue Zhang
(74) *Attorney, Agent, or Firm*—Sughrue Mion, PLLC

(57) ABSTRACT

A power supply device having an overvoltage cutoff function, an image display device, and a method of cutting off overvoltage are provided. The power supply device includes a switch unit which cuts off a power supply to the power supply device; and an overvoltage sensing unit which compares a voltage of the power supply device with a specified reference voltage, and if the voltage of the power supply device is higher than the specified reference voltage, generates an overvoltage cutoff signal to control the switch unit. The overvoltage cutoff signal is used to report a power supply cutoff state. Accordingly, the damage of the power supply device due to an unstable AC input voltage can be prevented and the user can be alerted to the overvoltage through the display of the power supply cutoff state.

18 Claims, 5 Drawing Sheets

POWER SUPPLY DEVICE HAVING OVERVOLTAGE CUTOFF FUNCTION, IMAGE DISPLAY DEVICE, AND METHOD OF CUTTING OFF OVERVOLTAGE

CROSS-REFERENCE TO RELATED APPLICATION

This application claims priority from Korean Patent Application No. 10-2006-0093428, filed Sep. 26, 2006, in the Korean Intellectual Property Office, the disclosure of which is incorporated by reference in its entirety.

BACKGROUND OF THE INVENTION

1. Field of the Invention

Apparatuses and methods consistent with the present invention relate to a power supply device having an overvoltage cutoff function, an image display device, and a method of cutting off overvoltage, and more particularly, to a power supply device having an overvoltage cutoff function, an image display device, and a method of cutting off overvoltage, that can prevent damage to a power supply device due to an unstable AC input voltage by providing an overvoltage cutoff circuit in the power supply device, and enable a user to recognize the cutoff of the power supply to the power supply device due to the overvoltage by displaying the power supply cutoff state.

2. Description of the Related Art

Referring to FIG. 1, a general power supply device comprises an AC power input unit 110, a rectifying unit 120, a capacitor 130, and a DC-to-DC converter 140.

The AC power input unit 110 receives an AC power from an AC power supply. The rectifying unit 120 rectifies the AC supply voltage input to the AC power input unit 110 and performs smoothing of the rectified voltage to output a DC voltage. The rectifying unit 120 generally comprises bridge diodes.

The DC voltage rectified by the rectifying unit 120 is charged in the capacitor 130, and the DC-to-DC converter 140 changes the voltage from the capacitor 130 to a specified voltage level.

However, in some areas in which AC supply voltages are unstably supplied (e.g., Commonwealth of Independent States (CIS), China, Southeast Asia, Central and South America, and so forth) or in areas in which AC power is supplied using independent electric generators, the conventional power supply devices are frequently damaged due to AC overvoltage, and product liability problems occur in some cases.

In such areas, AC supply voltage of more than 300V, which exceeds the rated voltage, may be supplied, and this may cause the capacitor in the power supply device to be damaged. In this case, the voltage being applied to the capacitor becomes 1.414 times the input voltage. If the voltage being applied to the capacitor exceeds the rated voltage of the capacitor over a specified time period, the capacitor may lose its dielectric strength, and an internal dielectric material may explode with the generation of noise and the occurrence of a fire.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a power supply device having an overvoltage cutoff function, an image display device, and a method of cutting off overvoltage, that can prevent the damage of a power supply device due to an unstable AC input voltage by providing an overvoltage cutoff circuit in the power supply device, and enable a user to recognize the cutoff of the power supply to the power supply device due to the overvoltage by displaying the power supply cutoff state.

According to an aspect of the present invention, there is provided a power supply device comprising: a switch unit which cuts off a power supply to the power supply device; and an overvoltage sensing unit which compares a voltage of the power supply device with a specified reference voltage, and if the voltage of the power supply device is higher than the specified reference voltage, generates an overvoltage cutoff signal to control the switch unit; wherein the overvoltage cutoff signal is used to report a power supply cutoff state.

The overvoltage sensing unit may comprise a comparator which compares the voltage of the power supply device with the specified reference voltage and generates the overvoltage cutoff signal to control the switch unit.

The switch unit may comprise a transistor or a relay.

The power supply cutoff state may be reported in advance before the power supply is cut off by the switch unit.

According to another aspect of the present invention, there is provided an image display device provided with a power supply device, which comprises: a switch unit which cuts off a power supply to the power supply device; an overvoltage sensing unit which compares a voltage of the power supply device with a specified reference voltage, and if the voltage of the power supply device is higher than the specified reference voltage, generates an overvoltage cutoff signal to control the switch unit; and a control unit which receives the overvoltage cutoff signal and operates to display a power supply cutoff state.

The image display device according to another aspect of the present invention may further comprise a display unit for displaying the power supply cutoff state.

The overvoltage sensing unit may comprise a comparator which compares the voltage of the power supply device with the specified reference voltage and generates the overvoltage cutoff signal to control the switch unit.

The switch unit may comprise a transistor or a relay.

The power supply cutoff state may be displayed using an on-screen display (OSD).

The power supply cutoff state may be reported in advance before the power supply is cut off by the switch unit.

According to still another aspect of the present invention, there is provided a method of cutting off overvoltage, which comprises comparing a voltage of a power supply device with a specified reference voltage, and if the voltage of the power supply device is higher than the specified reference voltage, generating an overvoltage cutoff signal; cutting off the power supply to the power supply device in accordance with the overvoltage cutoff signal; and receiving the overvoltage cutoff signal to display a power supply cutoff state.

BRIEF DESCRIPTION OF THE DRAWINGS

The above and other aspects of the present invention will become more apparent by describing certain exemplary embodiments of the present invention with reference to the accompanying drawings, in which.

DETAILED DESCRIPTION OF EXEMPLARY EMBODIMENTS OF THE INVENTION

Figure 1:
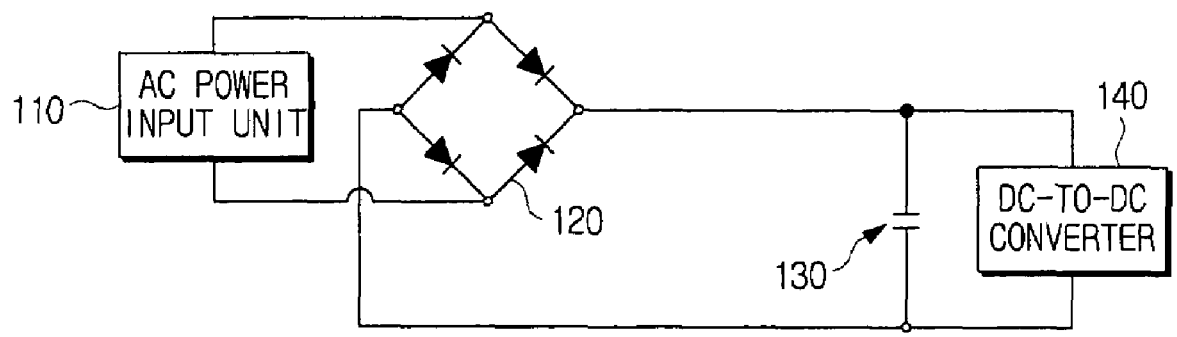
FIG. 1 is a circuit diagram illustrating the construction of a conventional power supply device.

Exemplary embodiments of the present invention will now be described in detail with reference to the annexed drawings. In the drawings, the same elements are denoted by the same reference numerals throughout the drawings. In the following description, detailed descriptions of known functions and configurations incorporated herein have been omitted for conciseness and clarity.

Figure 2:
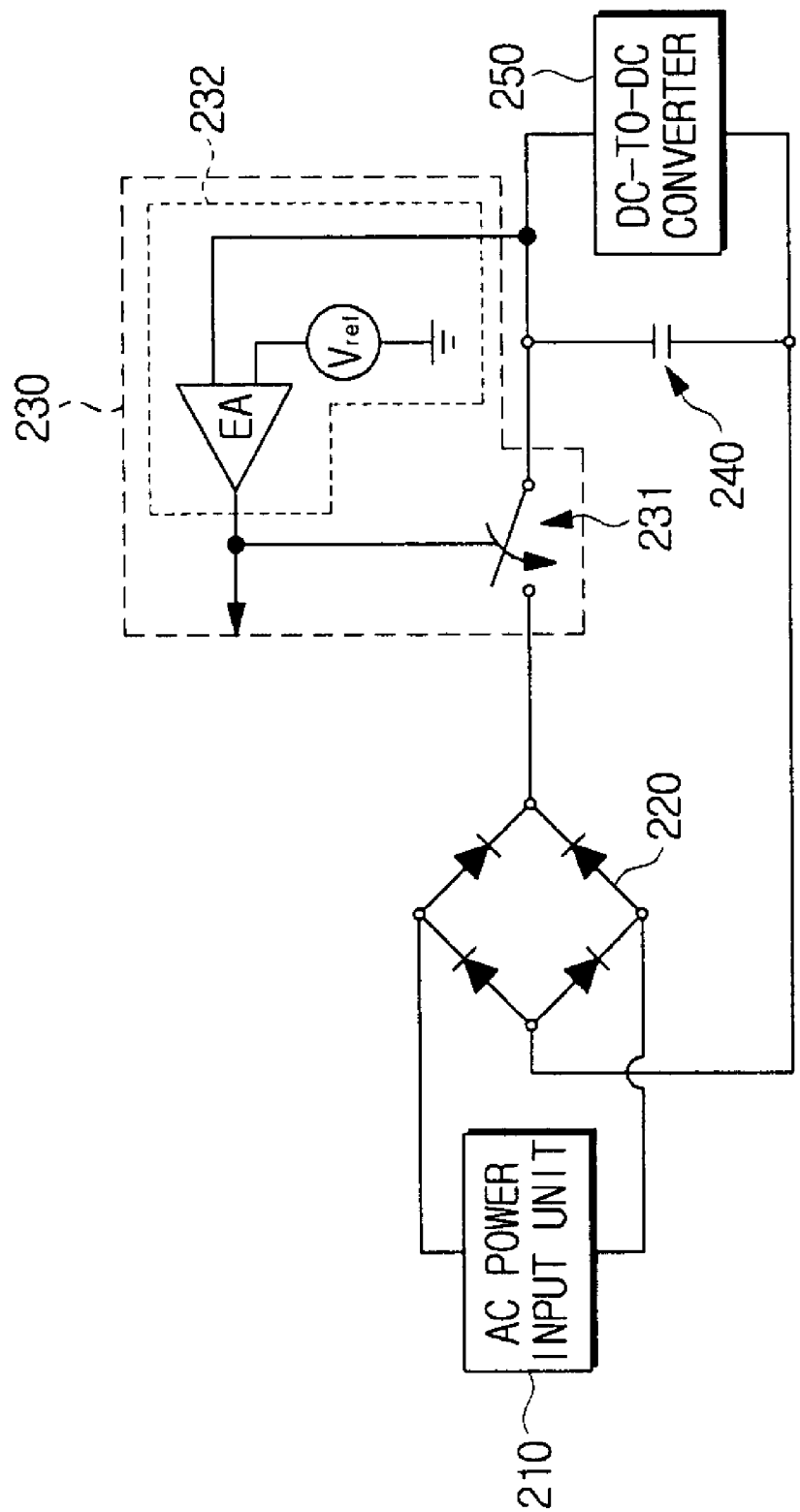
FIG. 2 is a circuit diagram illustrating the construction of a power supply device according to an exemplary embodiment of the present invention.

FIG. 2 is a circuit diagram illustrating the construction of a power supply device having an overvoltage cutoff circuit according to an exemplary embodiment of the present invention.

The power supply device according to an exemplary embodiment of the present invention comprises an AC power input unit 210, a rectifying unit 220, an overvoltage cutoff circuit 230 composed of a switch unit 231 and an overvoltage sensing unit 232, a capacitor 240, and a DC-to-DC converter 250.

The AC power input unit 210 receives an AC power from an AC power supply. The rectifying unit 220 rectifies the AC supply voltage input to the AC power input unit 210 and performs smoothing of the rectified voltage to output a DC voltage. The rectifying unit 220 generally comprises bridge diodes.

The DC voltage rectified by the rectifying unit 220 is charged in the capacitor 240 through the switch unit 231. The DC-to-DC converter 250 changes the voltage from the capacitor 240 to a specified voltage level.

The overvoltage cutoff circuit 230 comprises the switch unit 231 and the overvoltage sensing unit 232. The overvoltage sensing unit 232 senses the occurrence of overvoltage by comparing the voltage of the power supply device with a specified reference voltage, and generates an overvoltage cutoff signal to control the switch unit 231.

Specifically, a comparator EA of the overvoltage sensing unit 232 compares the voltage from the capacitor 240 of the power supply device with the specified reference voltage Vref. The voltage from the capacitor 240 may be a voltage divided by the specified number of resistors. For example, if the voltage obtained by dividing the voltage from the capacitor 240 through the resistors exceeds 2.5V in a state that the reference voltage Vref is 2.5V, the overvoltage cutoff circuit 230 generates the overvoltage cutoff signal.

The comparator EA of the overvoltage cutoff circuit 230 compares the divided voltage with the reference voltage, and if the divided voltage is higher than the reference voltage, it outputs a high-level signal as the overvoltage cutoff signal. The switch unit 231 receives the high-level signal and operates to cut off the power supply to the capacitor.

The switch unit 231 receives the overvoltage cutoff signal from the overvoltage sensing unit 232, and cuts off the power supply to the power supply device. The switch unit 231 may comprise a transistor or a relay.

The overvoltage cutoff signal output from the overvoltage sensing unit 232 may be used to report the power supply cutoff state of the switch unit 231. The power supply cutoff state may be reported to a user through a sound or a message so that it is not misrecognized as device trouble.

Figure 3:
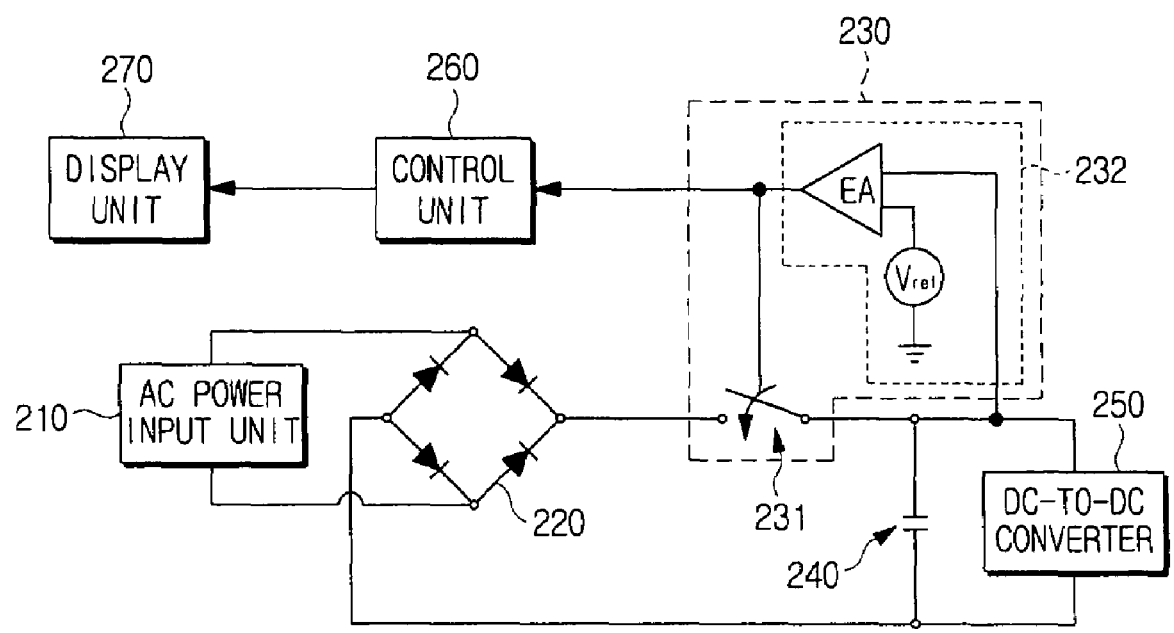
FIG. 3 is a circuit diagram illustrating the construction of an image display device provided with an overvoltage cutoff function according to another exemplary embodiment of the present invention.

FIG. 3 is a circuit diagram illustrating the construction of an image display device provided with an overvoltage cutoff function according to another exemplary embodiment of the present invention.

In this exemplary embodiment of the present invention, a control unit 260 and a display unit 270 are additionally provided.

The control unit 260 receives the overvoltage cutoff signal and controls the display unit to display the power supply cutoff state. Here, the display unit 270 comprises a display panel of the image display device.

The control unit 260 receives an output signal of the comparator EA of the overvoltage sensing unit 230, and if the overvoltage cutoff signal is received from the comparator, it controls the display unit to display the power supply cutoff state due to the overvoltage. The control unit 260 may comprise a microprocessor or microcontroller unit (MCU), and is provided with a memory such as a ROM.

If the power supply to the capacitor 230 is cut off by the operation of the switch unit 231 of the overvoltage cutoff circuit 230, the control unit 260 receives the overvoltage cutoff signal, and controls the display unit 270 to display a message reporting that the power supply will be cut off due to an AC overvoltage. This power supply cutoff state is displayed using a caption such as an on-screen display (OSD) or a picture.

Figure 4:
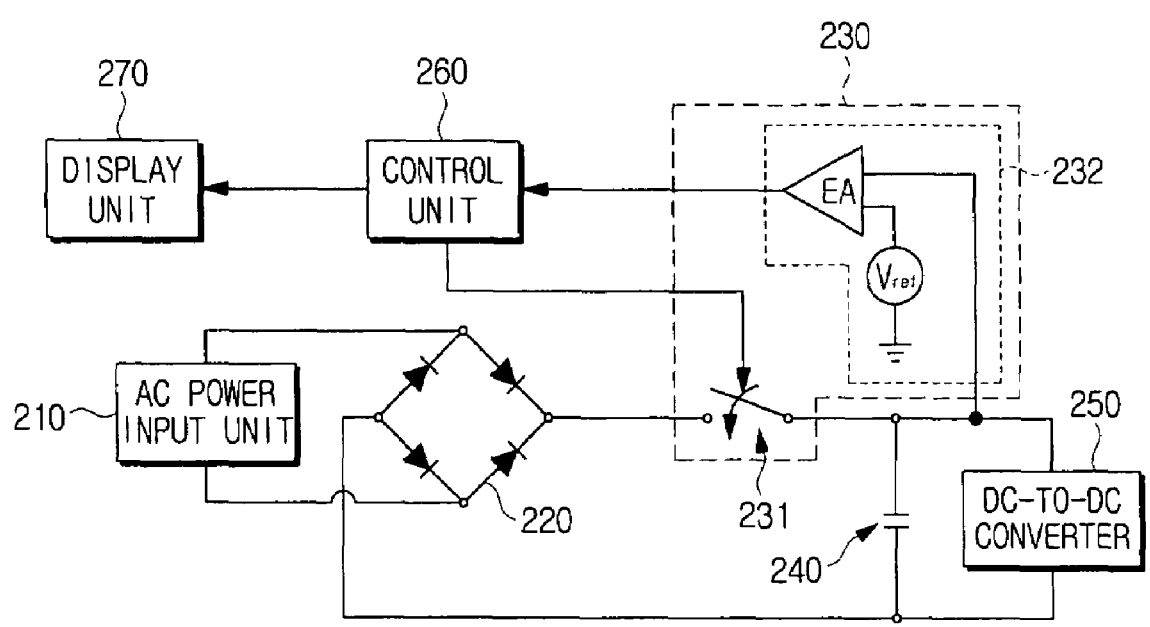
FIG. 4 is a circuit diagram illustrating the construction of an image display device provided with an overvoltage cutoff function according to still another exemplary embodiment of the present invention.

FIG. 4 is a circuit diagram illustrating the construction of an image display device provided with an overvoltage cutoff function according to still another exemplary embodiment of the present invention.

In this exemplary embodiment of the present invention, since the same constituent elements as the above-described embodiment are used, any separate description thereof will be omitted.

However, in this embodiment of the present invention, the control unit 260 is constructed to control the switch unit 231. In the same manner as the above-described exemplary embodiment, the control unit 260 receives the overvoltage cutoff signal from the overvoltage sensing unit 232 and controls the display unit 270 to display the power supply cutoff state due to the overvoltage. In this case, the power supply cutoff state is displayed before the overvoltage cutoff signal is applied to the switch unit 231. Accordingly, after the display unit 270 displays that the power supply will be cut off due to overvoltage, then the switch 231 receives the overvoltage cutoff signal from the control unit 260 to cut off the power supply to the capacitor 240. The capacitor 240 may be damaged if the overvoltage is supplied over a specified time, and thus the delay of the specified time by the control unit 260 is permitted even if the overvoltage occurs.

This function is to make a user recognize in advance that the power supply will be cutoff to protect the power supply device against the AC overvoltage, and to prevent the user from misrecognizing the power supply cutoff state as device trouble.

Figure 5:
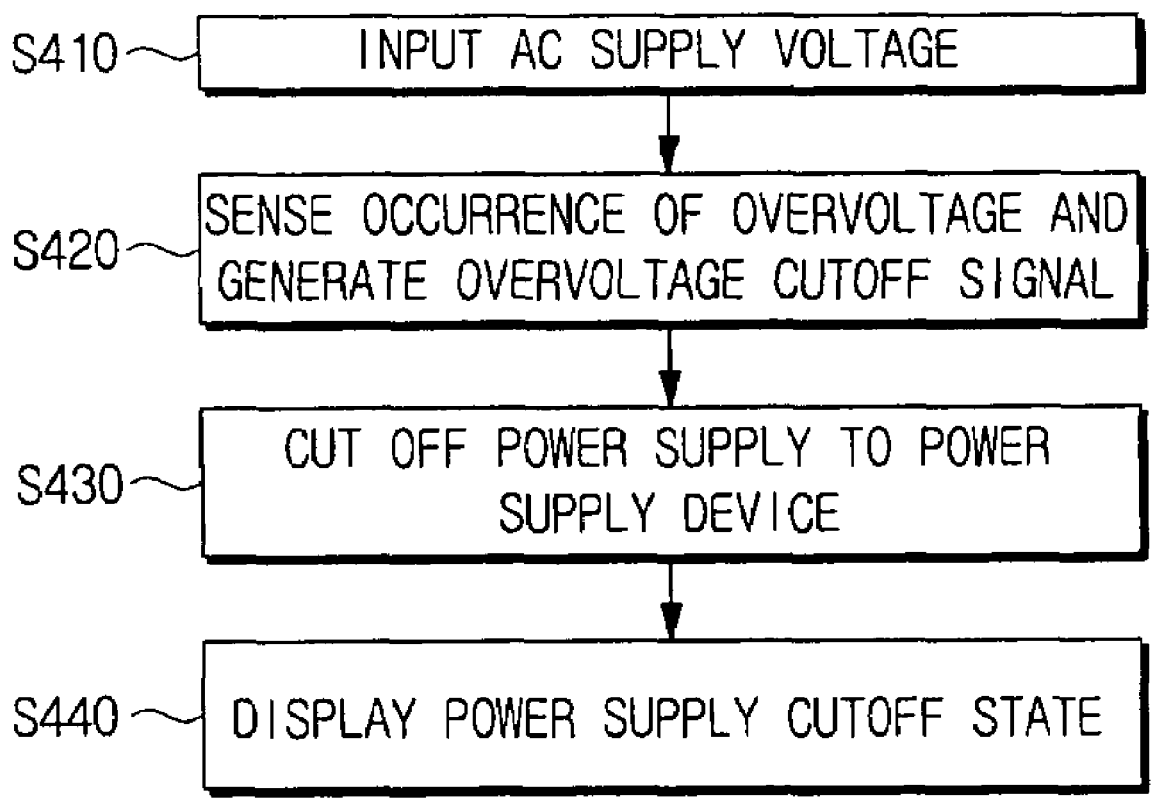
FIG. 5 is a flowchart illustrating a process of cutting off overvoltage according to an exemplary embodiment of the present invention.

FIG. 5 is a flowchart illustrating a process of cutting off overvoltage according to an exemplary embodiment of the present invention.

First, the power supply device receives the AC supply voltage at step (S410). The overvoltage sensing unit 232 senses the occurrence of overvoltage by comparing the voltage of the power supply device with the specified reference voltage, and generates the overvoltage cutoff signal at step (S420). At this time, the comparison of the voltage of the power supply device with the reference voltage is performed by the comparator, and the overvoltage cutoff signal is generated when the voltage of the power supply device is higher than the reference voltage. Herein, the voltage obtained by dividing the voltage from the capacitor 240 through the resistors is used as the voltage of the power supply device.

Then, the switch unit 231 cuts off the power supply to the power supply device in accordance with the overvoltage cutoff signal generated by the overvoltage sensing unit 232 at step (S430).

In addition, the control unit 260 receives the overvoltage cutoff signal and controls the display unit to display the power supply cutoff state at step (S440). The power supply cutoff state is displayed using OSD so that the user can recognize the cause of the power supply cutoff, and this state is displayed on the screen in advance before the switch unit 231 performs the power supply cutoff operation.

As described above, according to the power supply device having an overvoltage cutoff function, the image display device, and the method of cutting off overvoltage according to exemplary embodiments of the present invention, the damage of the power supply device due to an unstable AC input voltage can be prevented by providing the overvoltage cutoff circuit in the power supply device, and the user can recognize the cutoff of the power supply to the power supply device due to the overvoltage by displaying the power supply cutoff state.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A power supply device comprising:
   a rectifying unit which receives an AC supply voltage and rectifies the AC supply voltage to output a DC voltage;
   a capacitor which receives the DC voltage output from the rectifying unit;
   a switch unit which is disposed between the rectifying unit and the capacitor, provides the DC voltage output from the rectifying unit if the switch unit is closed, and cuts off the DC voltage output from the rectifying unit to the capacitor if the switch unit is open; and
   an overvoltage sensing unit which compares a voltage from the capacitor with a specified reference voltage, and if the voltage of the capacitor is higher than the specified reference voltage, generates an overvoltage cutoff signal to control the switch unit;
   wherein the overvoltage cutoff signal is used to report a power supply cutoff state; and
   a control unit disposed between the switch and the overvoltage sensing unit, the control unit controls a state of the switch and receives the overvoltage cutoff signal from the overvoltage sensing unit and reports the power supply cutoff state to a display unit for a predetermined time before the power supply is cut off by the switch.

2. The power supply device of claim 1, wherein the overvoltage sensing unit comprises a comparator which compares the voltage of the capacitor with the specified reference voltage and generates the overvoltage cutoff signal to control the switch unit.

3. The power supply device of claim 1, wherein the switch unit comprises a transistor or a relay.

4. The power supply device of claim 1, wherein the power supply cutoff state is reported in advance before the DC voltage output from the rectifying unit to the capacitor is cut off by the switch unit.

5. An image display device provided with a power supply device, comprising:
   a rectifying unit which receives an AC supply voltage and rectifies the AC supply voltage to output a DC voltage;
   a capacitor which receives the DC voltage output from the rectifying unit;
   a switch unit which is disposed between the rectifying unit and the capacitor, provides the DC voltage output from the rectifying unit if the switch unit is closed, and cuts off the DC voltage output from the rectifying unit to the capacitor if the switch unit is open;
   an overvoltage sensing unit which compares a voltage from the capacitor with a specified reference voltage, and if the voltage of the capacitor is higher than the specified reference voltage, generates an overvoltage cutoff signal to control the switch unit; and
   a control unit which receives the overvoltage cutoff signal and operates to display a power supply cutoff state,
   wherein the control unit is disposed between the switch and the overvoltage sensing unit, and controls a state of the switch unit, receives the overvoltage cutoff signal from the overvoltage sensing unit, and reports the power supply cutoff state to a display unit for a predetermined time before the power supply is cut off by the switch unit.

6. The image display device of claim 5, further comprising a display unit which displays the power supply cutoff state.

7. The image display device of claim 5, wherein the overvoltage sensing unit comprises a comparator which compares the voltage of the capacitor with the specified reference voltage and generates the overvoltage cutoff signal to control the switch unit.

8. The image display device of claim 5, wherein the switch unit comprises a transistor or a relay.

9. The image display device of claim 6, wherein the power supply cutoff state is displayed using on-screen display (OSD).

10. The image display device of claim 6, wherein the power supply cutoff state is reported in advance before the DC voltage output from the rectifying unit to the capacitor is cut off by the switch unit.

11. A method of cutting off overvoltage, comprising:
comparing a voltage of a power supply device with a specified reference voltage, and if the voltage of the power supply device is higher than the specified reference voltage, generating an overvoltage cutoff signal;
cutting off the power supply provided from a rectifying unit to a capacitor in accordance with the overvoltage cutoff signal;
receiving the overvoltage cutoff signal to display a power supply cutoff state;
Reporting the power supply cutoff state to a display unit; and
Displaying the power supply cutoff state for a predetermined time before the power supply is cut off.

12. The method of claim 11, further comprising displaying the power supply cutoff state.

13. The method of claim 11, wherein the step of generating the overvoltage cutoff signal is performed by a comparator.

14. The method of claim 11, wherein the step of cutting off the power supply is performed by a transistor or a relay.

15. The method of claim 12, wherein the power supply cutoff state is displayed using on-screen display (OSD).

16. The method of claim 12, wherein the power supply cutoff state is reported in advance before the power supply is cut off.

17. The power supply device of claim 11, wherein the voltage of the power supply device is a voltage from the capacitor.

18. The power supply device of claim 1, further including a DC-to-DC converter disposed in parallel with the capacitor, and changes the voltage from the capacitor to a specified voltage level and outputs the specified voltage level from the power supply device.

* * * * *